(12) United States Patent
Chen et al.

(10) Patent No.: US 11,521,041 B2
(45) Date of Patent: Dec. 6, 2022

(54) FACT VALIDATION METHOD AND SYSTEM, COMPUTER DEVICE AND STORAGE MEDIUM

(71) Applicant: National University of Defense Technology, Hunan (CN)

(72) Inventors: Honghui Chen, Hunan (CN); Chonghao Chen, Hunan (CN); Fei Cai, Hunan (CN); Wanyu Chen, Hunan (CN); Jianming Zheng, Hunan (CN); Taihua Shao, Hunan (CN); Yupu Guo, Hunan (CN)

(73) Assignee: National University of Defense Technology, Changsha (CN)

( * ) Notice: Subject to any disclaimer, the term of this patent is extended or adjusted under 35 U.S.C. 154(b) by 0 days.

(21) Appl. No.: 17/575,466

(22) Filed: Jan. 13, 2022

(65) Prior Publication Data

US 2022/0230050 A1 Jul. 21, 2022

(30) Foreign Application Priority Data

Jan. 21, 2021 (CN) .......................... 202110081136.X

(51) Int. Cl.
*G06N 3/04* (2006.01)
(52) U.S. Cl.
CPC ....................................... *G06N 3/04* (2013.01)
(58) Field of Classification Search
CPC ....................................................... G06N 3/04
See application file for complete search history.

(56) References Cited

U.S. PATENT DOCUMENTS

| 10,196,144 B2 | 2/2019 | Myslinski | |
|---|---|---|---|
| 2018/0137001 A1* | 5/2018 | Zong | ...................... G06N 5/022 |
| 2019/0354544 A1* | 11/2019 | Hertz | ................... G06K 9/6259 |

(Continued)

FOREIGN PATENT DOCUMENTS

| CN | 107003997 A | 8/2017 |
|---|---|---|
| CN | 110837892 A | 2/2020 |

(Continued)

OTHER PUBLICATIONS

Shi et. al., "Discriminative predicate path mining for fact checking in knowledge graphs", Jul. 2016 (Year: 2016).*

(Continued)

*Primary Examiner* — Omar F Fernandez Rivas
*Assistant Examiner* — Selene A. Haedi
(74) *Attorney, Agent, or Firm* — Dragon Sun Law Firm, PC; Jinggao Li; Nathaniel Perkins

(57) ABSTRACT

A fact validation method including the following steps: a statement to be validated is inputted and a searching is made for the statement to obtain an evidence set of the statement; a hierarchical heterogeneous graph consisting of an entity node, a sentence node and a context node is constructed based on the evidence set; the statement and the evidence set are spliced and a node is initialized to obtain feature representation of the node; the feature representation of the node is updated based on inference according to a propagation direction of a neural network of the node in the hierarchical heterogeneous graph; and an inference path for the updated feature representation of the node is built and a prediction result of the statement is output according to the inference path.

16 Claims, 5 Drawing Sheets

(56) References Cited

U.S. PATENT DOCUMENTS

2020/0242485 A1* 7/2020 TeNyenhuis ......... G06V 10/426
2022/0108188 A1* 4/2022 Wu ........................ G06N 5/04

FOREIGN PATENT DOCUMENTS

| CN | 111784199 A | 10/2020 |
|---|---|---|
| EP | 3633680 A1 | 4/2020 |

OTHER PUBLICATIONS

Wang et. al., "Heterogeneous Graph Neural Networks for Extractive Document Summarization", Jul. 2020 (Year: 2020).*

Liu et. al., "Fine-grained Fact Verification with Kernel Graph Attention Network", Apr. 2020 (Year: 2020).*

Xiao Wang et. al., "Heterogeneous Graph Attention Network", May 2019 (Year: 2019).*

Zhu et al., "HGCN: A Heterogeneous Graph Convolutional Network-Based Deep Learning Model Toward Collective Classification", 2020 (Year: 2020).*

Xie Yifei, et al., "Graph-Based Hierarchical Attention Networks for Fact Verification," Computer Engineering and Applications, Oct. 29, 2020.

Chen, W., "Joint neural collaborative filtering for recommender systems," ACM Transactions information Systems (TOIS), Dec. 31, 2019.

Zhong, W., et al., "Reasoning over semantic-level graph for fact checking," arXiv preprint arXiv1909.03745, Dec. 31, 2019.

Christopoulou, F., et al., "Connecting the dots: Document-level neural relation extraction with edge-oriented graphs," arXiv preprint arXiv:1909.00228, Dec. 31, 2019.

Ren, Y., et al., Dec. 31, 2020, "HGAT: hierarchical graph attention network for fake news detection."

Shu, K., et al., "Hierarchical propagation networks for fake news detection: Investigation and exploitation," In Proceedings of the International Conference on Web and Social Media, May 31, 2020.

Lin, P., et al., "Discovering graph patterns for fact checking in knowledge graphs," International Conference on Database Systems for Advanced Applications, May 31, 2018.

* cited by examiner

FACT VALIDATION METHOD AND SYSTEM, COMPUTER DEVICE AND STORAGE MEDIUM

CROSS-REFERENCE TO RELATED APPLICATIONS

This application claims priorities from the Chinese patent application 202110081136.X filed Jan. 21, 2021, the content of which are incorporated herein in the entirety by reference.

TECHNICAL FIELD

The disclosure relates to the field of information technology, in particular to a fact validation method and system, a computer device and a storage medium.

BACKGROUND

As for fact validation, existing methods mainly analogize a fact validation task to a traditional natural language inference task, and support a downstream prediction task by constructing statement-evidence pairs and extracting features. In traditional natural language inference methods, generally statements and related evidence sentences are spliced and corresponding features at a sentence level are extracted to serve as an input of a prediction layer. In addition, a statement-evidence pair can be constructed for each evidence sentence, so that influence of different evidence can be taken into account more finely. However, in these methods, semantic relevancies between evidence sentences are not taken into account, so it is difficult to address some statements that require multiple evidences for judging together. In order to solve this problem, by introducing a fully connected graph structure and taking different evidence sentences as nodes in the graph, the integrating and inferring of the evidence sentences can be carried out based on the graph. In addition to this, it is also proposed to construct a graph on split evidence sentences so as to further explore possible semantic association between evidence.

However, in the previous methods, usually only the features at the sentence level are extracted as feature representations of the evidence, but important features that can combine entities and contexts to enrich the evidence representations are ignored. In addition, the existing methods are mainly to intended to improve accuracy of a tag prediction, while exploration of interpretability of a fact validation model is ignored, which may lead to unreliable verification results. Moreover, existing models usually only focus on the fact validation in a single evidence or multi-evidence scenario, and can't be applied to both scenarios.

SUMMARY

On this basis, it is necessary to provide a fact validation method and system, a computer device and a storage medium in light of above technical problems.

In a first aspect, a fact validation method is provided in an embodiment of the disclosure, which includes following steps:

inputting a statement to be validated and searching for the statement to obtain an evidence set of the statement;

constructing a hierarchical heterogeneous graph consisting of an entity node, a sentence node and a context node based on the evidence set;

The statement and the evidence set are spliced and a node is initialized to obtain feature representation of the node.

updating the feature representation of the node based on inference according to a propagation direction of a neural network of the node in the hierarchical heterogeneous graph; and building an inference path for the updated feature representation of the node and outputting a prediction result of the statement according to the inference path.

Further, the inputting the statement to be validated and searching for the statement to obtain an evidence set of the statement includes:

extracting a key word group of the statement using a sentence parser according to the input statement;

retrieving related documents of the key word group through an application interface of a searching tool and storing the related documents in an article set;

building a sentence retrieval model so as to perform a sentence retrieval on an article in the article set and outputting associated sentences related to the statement; and scoring relevance of the associated sentences using the retrieval model and taking a sentence with a score falling within a preset threshold as the evidence set.

Further, the constructing the hierarchical heterogeneous graph consisting of the entity node, the sentence node and the context node based on the evidence set includes:

respectively extracting the context node composed of all of the sentences, the sentence node composed of evidence sentences and the entity node composed of noun phrases from the evidence set;

constructing a first directed edge from the entity node to the sentence node and a second directed edge from the sentence node to the context node; and constructing third directed edges for a sentence-level link, a context-level link and an article-level link according to the entity node.

Further, the building an inference path for the updated feature representation of the node and outputting a prediction result of the statement according to the inference path includes:

splicing feature representations of the entity node, the sentence node and the context node and obtaining feature representation of the inference path through a single-layer perceptron;

calculating an alignment vector of the inference path relative to the statement so as to obtain a selection probability of the inference path; and calculating a predicted label distribution of the statement according to the selection probability and inferring the prediction result of the statement according to the predicted label distribution.

In another aspect, a fact validation system is provided in an embodiment of the disclosure, which includes an evidence retrieval module, a heterogeneous graph module, a node initialization module, a node updating module and a result prediction module.

The evidence retrieval module is configured for inputting a statement to be validated and searching for the statement to obtain an evidence set of the statement.

The heterogeneous graph module is configured for constructing a hierarchical heterogeneous graph consisting of an entity node, a sentence node and a context node based on the evidence set.

The node initialization module is configured for splicing the statement and the evidence set and initializing a node to obtain feature representation of the node.

The node updating module is configured for updating the feature representation of the node based on inference according to a propagation direction of a neural network of the node in the hierarchical heterogeneous graph.

The result prediction module is configured for building an inference path for the updated feature representation of the node and outputting a prediction result of the statement according to the inference path.

Further, the evidence retrieval module includes an evidence set unit configured for:

extracting a key word group of the statement using a sentence parser according to the input statement;

retrieving related documents of the key word group through an application interface of a searching tool and storing the related documents in an article set;

building a sentence retrieval model so as to perform a sentence retrieval on an article in the article set and outputting associated sentences related to the statement; and scoring affinity of the associated sentences using the retrieval model and taking a sentence with a score falling within a preset threshold as the evidence set.

Further, the heterogeneous graph module includes a graph construction unit configured for:

respectively extracting the context node composed of all of the sentences, the sentence node composed of evidence sentences and the entity node composed of noun phrases from the evidence set;

constructing a first directed edge from the entity node to the sentence node and a second directed edge from the sentence node to the context node; and constructing third directed edges for a sentence-level link, a context-level link and an article-level link according to the entity node.

Further, the result prediction module includes a tag inferring unit configured for:

splicing feature representations of the entity nodes, the sentence nodes and the context nodes and obtaining feature representation of the inference path through a single-layer perceptron;

calculating an alignment vector of the inference path relative to the statement so as to obtain a selection probability of the inference path; and calculating a predicted label distribution of the statement according to the selection probability and inferring the prediction result of the statement according to the predicted label distribution.

A computer device is further provided in an embodiment of the disclosure, which includes a memory, a processor and a computer program stored on the memory and executable on the processor, and the processor implements following steps when executing the program:

A statement to be validated is inputted and a searching is made for the statement to obtain an evidence set of the statement.

A hierarchical heterogeneous graph consisting of an entity node, a sentence node and a context node is constructed based on the evidence set.

The statement and the evidence set are spliced and a node is initialized to obtain feature representation of the node.

The feature representation of the node is updated based on inference according to a propagation direction of a neural network of the node in the hierarchical heterogeneous graph.

An inference path for the updated feature representation of the node is built and a prediction result of the statement is output according to the inference path.

A computer-readable storage medium having a computer program stored thereon is provided in an embodiment of the present disclosure. following steps are realized when the program is executed by a processor.

A statement to be validated is inputted and a searching is made for the statement to obtain an evidence set of the statement.

A hierarchical heterogeneous graph consisting of an entity node, a sentence node and a context node is constructed based on the evidence set.

The statement and the evidence set are spliced and a node is initialized to obtain feature representation of the node.

The feature representation of the node is updated based on inference according to a propagation direction of a neural network of the node in the hierarchical heterogeneous graph.

An inference path for the updated feature representation of the node is built and a prediction result of the statement is output according to the inference path.

The disclosure has following beneficial effects: a fact validation method and system, a computer device and a storage medium are disclosed in the embodiments of the disclosure. In the method, firstly, a heterogeneous graph with nodes including sentences, entities and contexts is constructed according to the retrieved evidence sentences, and the feature representations of the context node, the sentence node and the entity node are respectively initialized by an encoder based on a bidirectional structure; secondly, a hierarchical structure is adopted to propagate semantic features from fine-grained nodes to coarse-grained nodes, a potential inference path is extracted from the graph and encoded by splicing feature representations of nodes involved in the same path; finally, a classifier is configured to predict a label of each inference path, and the results are aggregated by correlation between respective path and the statement. In this method, the hierarchical heterogeneous graph combined with different grained features is used to learn the evidence representation, which facilitates capturing of the relationship between the evidence. A propagation inferring process from a fine-grained feature to a coarse-grained feature facilitates improving interpretability of the inferring model, and presents effectiveness of a hierarchical heterogeneous graph neural network method, significantly improving accuracy and efficiency of the fact validation.

DETAILED DESCRIPTION

In order to make the objects, technical schemes and advantages of the present disclosure clearer, the present disclosure will be further described in detail with reference to the drawings and examples. It should be understood that the specific embodiments described herein are only used to explain the present disclosure, and are not intended to limit the present disclosure.

With explosion of information, people inevitably receive some false news and misleading statements. How to automatically validate authenticity of these statements has become an important research topic. In order to solve this problem, a fact validation task is proposed to automatically validate the authenticity of the statements, for example, by extracting relevant evidence from a trustworthy knowledge base such as WIKIPEDIA® to make inferring judgment. A fact validation model can correspondingly mark a statement as "supporting", "refuting" or "insufficient information", indicating whether the relevant evidence can support, refute the statement or that the statement cannot be judged.

Figure 1:
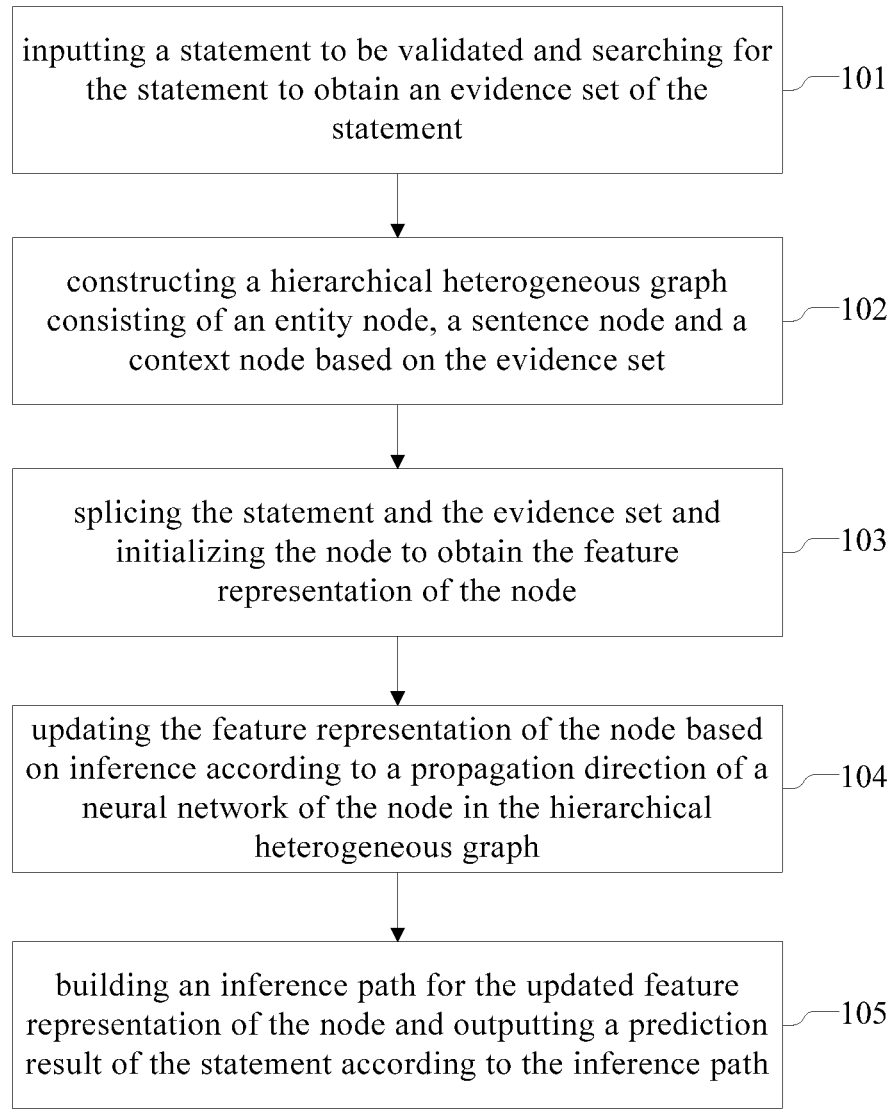
FIG. 1 is a flow diagram of a fact validation method in an embodiment.

In an embodiment, as shown in FIG. 1, a fact validation method is provided, which includes following steps 101 to 105.

In step 101, a statement to be validated is inputted and a searching is made for the statement to obtain an evidence set of the statement.

In step 102, a hierarchical heterogeneous graph consisting of an entity node, a sentence node and a context node is constructed based on the evidence set.

In step 103, the statement and the evidence set are spliced and a node is initialized to obtain feature representation of the node.

In step 104, the feature representation of the node is updated based on inference according to a propagation direction of a neural network of the node in the hierarchical heterogeneous graph.

In step 105, an inference path for the updated feature representation of the node is built and a prediction result of the statement is output according to the inference path.

Specifically, in the fact validation, firstly, the heterogeneous graph with nodes including sentences, entities and contexts is constructed according to the retrieved evidence sentences, and the feature representations of the context node, the sentence node and the entity node are respectively initialized by an encoder based on a bidirectional structure; secondly, a hierarchical structure is adopted to propagate semantic features from fine-grained nodes to coarse-grained nodes, a potential inference path is extracted from the graph and encoded by splicing feature representations of nodes involved in the same path; finally, a classifier is configured to predict a label of each inference path, and the results are aggregated by correlation between respective path and the statement. In this method, the hierarchical heterogeneous graph combined with different grained features is used to learn the evidence representation, which facilitates capturing of the relationship between the evidence. A propagation inferring process from a fine-grained feature to a coarse-grained feature facilitates improving interpretability of the inferring model, and presents effectiveness of a hierarchical heterogeneous graph neural network method, significantly improving accuracy and efficiency of the fact validation.

Figure 2:
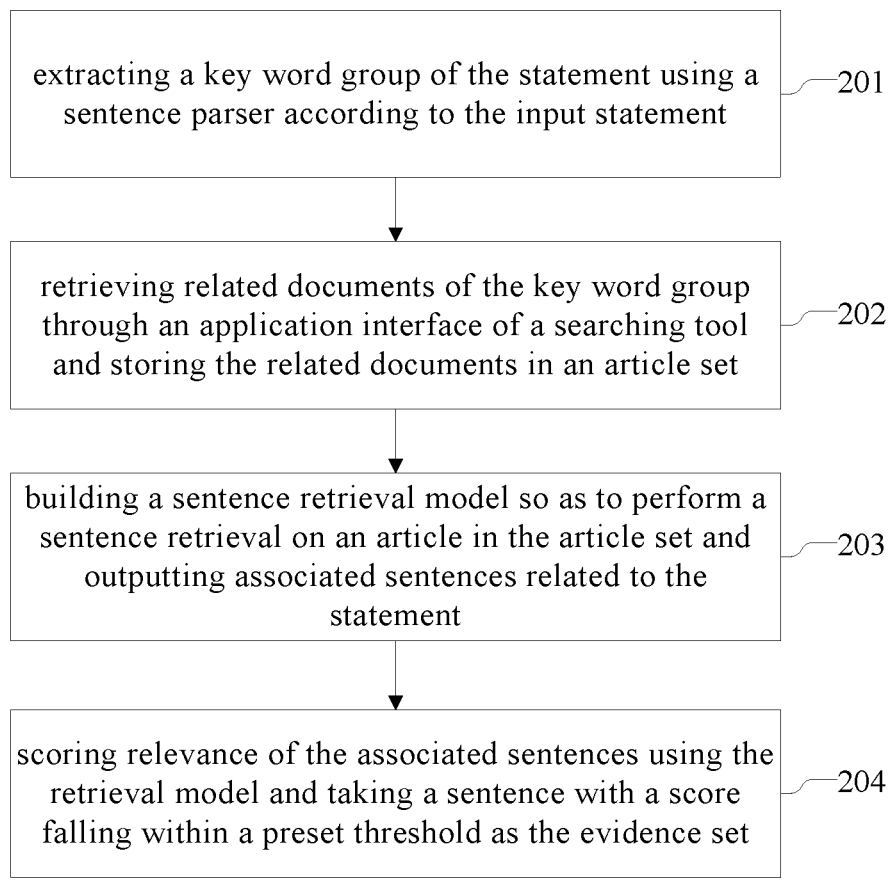
FIG. 2 is a flow diagram of evidence set acquisition in an embodiment.

In an embodiment, as shown in FIG. 2, an evidence set acquisition in the fact validation specifically includes following steps 201 to 204.

In step 201, a key word group of the statement is extracted using a sentence parser according to the input statement.

In step 202, related documents of the key word group are retrieved through an application interface of a searching tool and are stored in an article set.

In step 203, a sentence retrieval model is built so as to perform a sentence retrieval on an article in the article set and associated sentences related to the statement are output.

In step 204, relevance of the associated sentences is scored using the retrieval model and a sentence with a score falling within a preset threshold is taken as the evidence set.

Specifically, this process can be divided into two key stages, namely document retrieval and sentence selection. In the document retrieval, a method of entity links is used to retrieve the related documents. Specifically, in this embodiment, for each statement, a sentence parser based on a research library is firstly applied to extract a potential entity, which can be called a key word group in a sentence. Then, the related documents are searched in WIKIPEDIA® through an application interface provided by WIKIPEDIA®, and stored top K articles in a set which is defined as $A=\{A_1, \ldots, A_k\}$. In the sentence selection, ranking scores for sentences in articles retrieved for a given statement are generated using the retrieval model in this embodiment. The retrieval model is trained by using a modified hinge loss function with negative sampling. Finally, relevance scores of all of the retrieved sentences are calculated using the trained model, and finally top m sentences are output as the evidence set.

Figure 3:
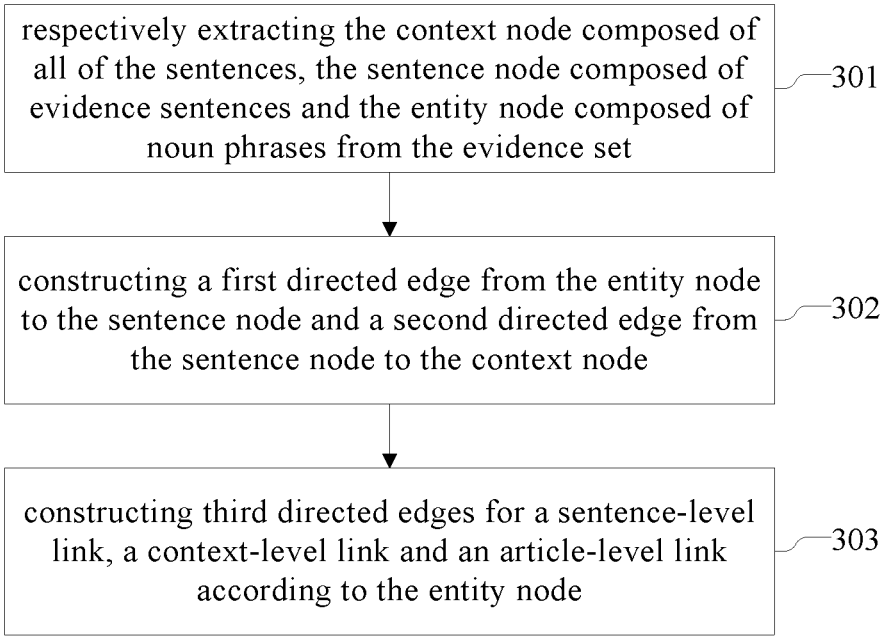
FIG. 3 is a flow diagram of constructing a hierarchical heterogeneous graph in an embodiment.

In an embodiment, as shown in FIG. 3, the constructing the hierarchical heterogeneous graph includes following steps 301 to 303.

In step 301, the context node composed of all of the sentences, the sentence node composed of evidence sentences and the entity node composed of noun phrases are respectively extracted from the evidence set.

In step 302, a first directed edge from the entity node to the sentence node and a second directed edge from the sentence node to the context node are constructed.

In step 303, third directed edges for a sentence-level link, a context-level link and an article-level link are constructed according to the entity node.

Specifically, in this embodiment, the evidence set is taken as an input to construct the hierarchical heterogeneous graph. In order to consider features of different levels, a graph composed of three types of nodes (namely, the entity node, the sentence node and the context node) is constructed in this embodiment. Specifically, in this embodiment all of the sentences in the evidence set are connected into a long sentence, and regards it as the context node. For the sentence node, each of the evidence sentences in the evidence set is taken as a separate node in this embodiment. In addition, in this embodiment, noun phrases in evidence sentences are extracted as the entity node by using a named entity identification tool, and two nodes may refer to a same entity. In order to restrict a relationship between a direction of information propagation and capturing of the evidence statements, directed edges from fine-grained nodes to coarse-grained nodes and undirected edges between similar nodes are designed in this embodiment. For the sentence node, an edge is established between each pair of sentences using a fully connected subgraph. In order to fully explore relationships between entities and avoid noise caused by a large number of entities, three types of edges for the entity node: the sentence-level link, the context-level link and the article-level link are constructed in this embodiment. The sentence-level link represents a connection between nodes in the same sentence, and the context-level link represents a connection between nodes belonging to a same entity in different articles. The connection between nodes constructed by the article-level link is for a case where one node is located in a title of an article and another node is located in the rest of the article. In addition, in this embodiment, a directed edge from the entity node to the sentence node for each entity-to-sentence pair is constructed, and a directed edge from the sentence node to the context node for each sentence-to-context pair is constructed. In this way, the hierarchical heterogeneous graph structure is finally obtained.

Figure 4:
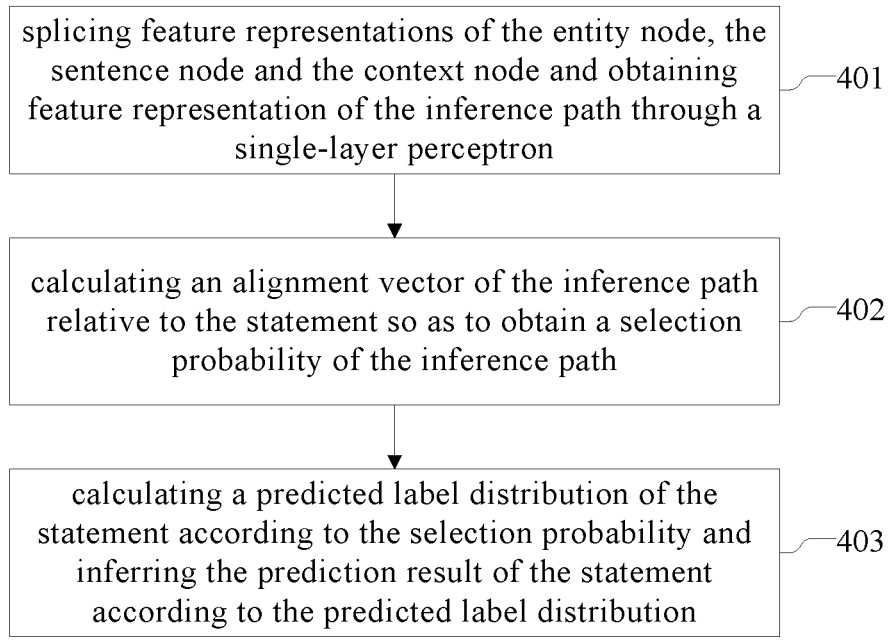
FIG. 4 is a flow diagram of fact validating through a predicted label distribution in an embodiment.

In an embodiment, as shown in FIG. 4, the fact validation through the predicted label distribution includes following steps 401 to 403.

In step 401, feature representations of the entity node, the sentence node and the context node are spliced and feature representation of the inference path is obtained through a single-layer perceptron.

In step 402, an alignment vector of the inference path relative to the statement is calculated so as to obtain a selection probability of the inference path.

In step 403, a predicted label distribution of the statement is calculated according to the selection probability and the prediction result of the statement is inferred according to the predicted label distribution.

Specifically, the feature representation should be initialized and updated before predicting. For example, for the context node, firstly, the statement and a sequence of evidence are spliced, and then input into a pre-trained language coding model to generate the feature representation of the context node; and for the entity node, vector representation of an entity is generated by using text span related to the entity. Specifically, firstly a binary matrix M is constructed, in which when a j-the word is within a text span interval of a i-th entity, it is marked as M(i,j)=1, otherwise it is marked as 0. Then, by multiplying word representation of the evidence sentence with the binary matrix M, rows related to the entity in a word representation matrix of the evidence are retained. Finally, vector representation of a word in the text span related to the entity is max-pooled and mean-pooled and then spliced, and final feature representation of the entity is obtained through the single-layer perceptron.

The node features are updated after being initialized. For a same type of nodes, such as the entity node, a graph attention network mechanism is used to propagate features of the nodes in this embodiment. For updating between different types of nodes, that is, from the entity node to the sentence node and from the sentence node to the context node, for example, an attention weight between the sentence node i and the entity node j is firstly calculated, and then features of related entity nodes are aggregated on the sentence node i to get sentence-aggregated features of the entity. In addition, in order to retain more features of the node itself, each of evidence sentence-aggregated features of the entity is combined with evidence sentence features to obtain candidate sentence node features in this embodiment. Generally speaking, feature propagation is carried out according to following steps: node features are updated in an entity graph composed of entities, for the entity node. The sentence node aggregates features from the entity node, and their own features are updated in a subgraph composed of sentence nodes. The context node aggregates features from the sentence node.

In a final prediction stage, prediction results from different inference paths are firstly obtained, and then final prediction results are generated by aggregating according to relevance with the statement. A link from the entity node to the context node is regarded as the inference path, that is, in an entity-sentence-context form. Feature representations of these nodes are spliced as vector representation of the whole path. Because one sentence node is linked with a plurality of entity nodes, it is necessary to distinguish the entity nodes related to the sentence. In this embodiment, the relevance scores $m_i$ of sentence nodes and multiple entity nodes are calculated; the representation of the entity node, the sentences and the feature representation of the context node are spliced together, and the feature representation $p_i$ of the inference path is obtained through a single-layer perceptron; then, an alignment vector of each inference path $p_i$ relative to the statement is calculated so as to generate the selection probability of each path; finally, the predicted label distribution of the statement is obtained by using the selection probability, and the prediction result of the statement is inferred according to the predicted label distribution.

It should be understood that although steps in the above flowchart are shown in sequence as indicated by arrows, these steps are not necessarily executed in sequence as indicated by arrows. Unless explicitly stated in this disclosure, there is no strict sequence restriction on execution of these steps, and these steps can be executed in other sequences. Moreover, at least a part of the steps in the above flowchart may include a plurality of sub-steps or stages, which are not necessarily completed at the same time, but can be executed at different times, and these sub-steps or stages is not necessarily executed in a sequential order, but can be alternately or alternatively executed with other steps or sub-steps of the other steps or at least a part of the stages.

Figure 5:
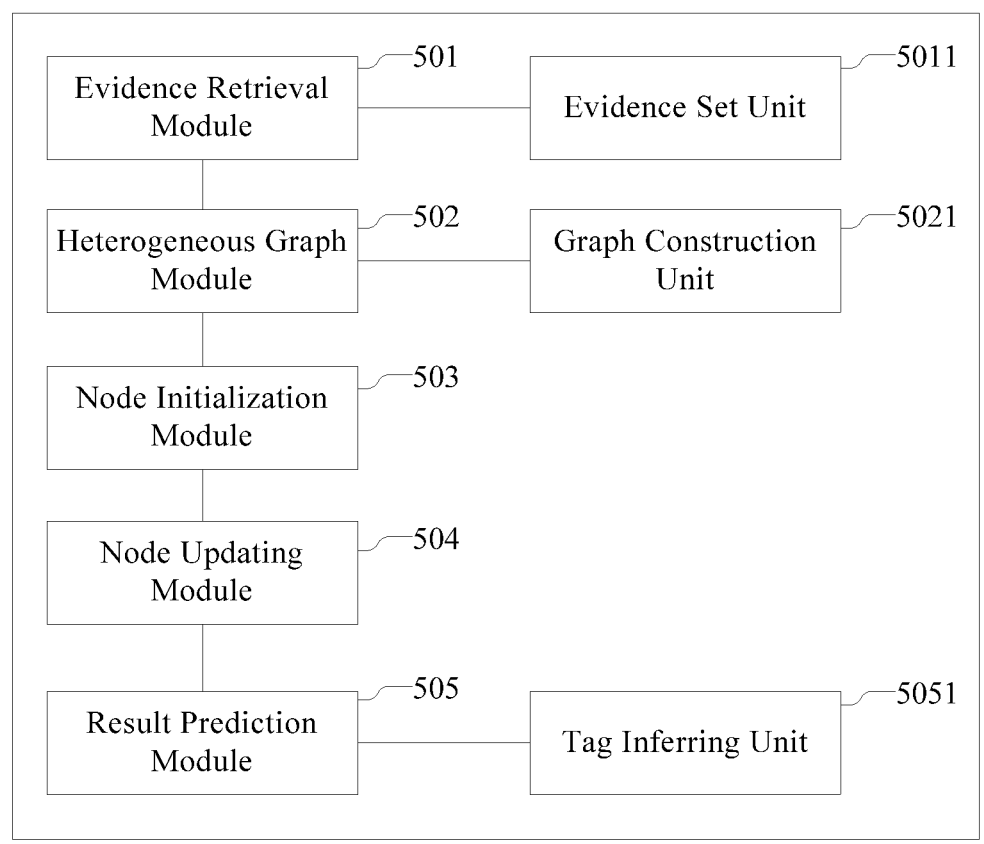
FIG. 5 is a structural block diagram of a fact validation system in an embodiment.

In an embodiment, as shown in FIG. 5, a fact validation system is provided in an embodiment of the disclosure, which includes an evidence retrieval module 501, a heterogeneous graph module 502, a node initialization module 503, a node updating module 504 and a result prediction module 505.

The evidence retrieval module 501 is configured for inputting a statement to be validated and searching for the statement to obtain an evidence set of the statement.

The heterogeneous graph module 502 is configured for constructing a hierarchical heterogeneous graph consisting of an entity node, a sentence node and a context node based on the evidence set.

The node initialization module 503 is configured for splicing the statement and the evidence set and initializing a node to obtain feature representation of the node.

The node updating module 504 is configured for updating the feature representation of the node based on inference according to a propagation direction of a neural network of the node in the hierarchical heterogeneous graph.

The result prediction module 505 is configured for building an inference path for the updated feature representation of the node and outputting a prediction result of the statement according to the inference path.

In an embodiment, as shown in FIG. 5, the evidence retrieval module 501 includes an evidence set unit 5011 configured for:

extracting a key word group of the statement using a sentence parser according to the input statement;

retrieving related documents of the key word group through an application interface of a searching tool and storing the related documents in an article set;

building a sentence retrieval model so as to perform a sentence retrieval on an article in the article set and outputting associated sentences related to the statement; and scoring affinity of the associated sentences using the retrieval model and taking a sentence with a score falling within a preset threshold as the evidence set.

In an embodiment, as shown in FIG. 5, the heterogeneous graph module 502 includes a graph construction unit 5021 configured for:

respectively extracting the context node composed of all of the sentences, the sentence node composed of evidence sentences and the entity node composed of noun phrases from the evidence set;

constructing a first directed edge from the entity node to the sentence node and a second directed edge from the sentence node to the context node; and constructing third directed edges for a sentence-level link, a context-level link and an article-level link according to the entity node.

In an embodiment, as shown in FIG. 5, the result prediction module 505 includes a tag inferring unit 5051 configured for:

splicing feature representations of the entity nodes, the sentence nodes and the context nodes and obtaining feature representation of the inference path through a single-layer perceptron;

calculating an alignment vector of the inference path relative to the statement so as to obtain a selection probability of the inference path; and calculating a prediction label distribution of the statement according to the selection probability and inferring the prediction result of the statement according to the predicted label distribution.

For specific definitions of the fact validation system, reference can be made to the above definitions on the fact validation method, which will not be repeatedly described here. Respective modules in the above-mentioned fact validation system can be realized in whole or in part by software, hardware and combination thereof. Respective modules described above can be embedded in or independent of a processor in a computer device in a form of hardware, or stored in a memory in the computer device in a form of software, so that the processor can call and execute operations corresponding to the above modules.

Figure 6:
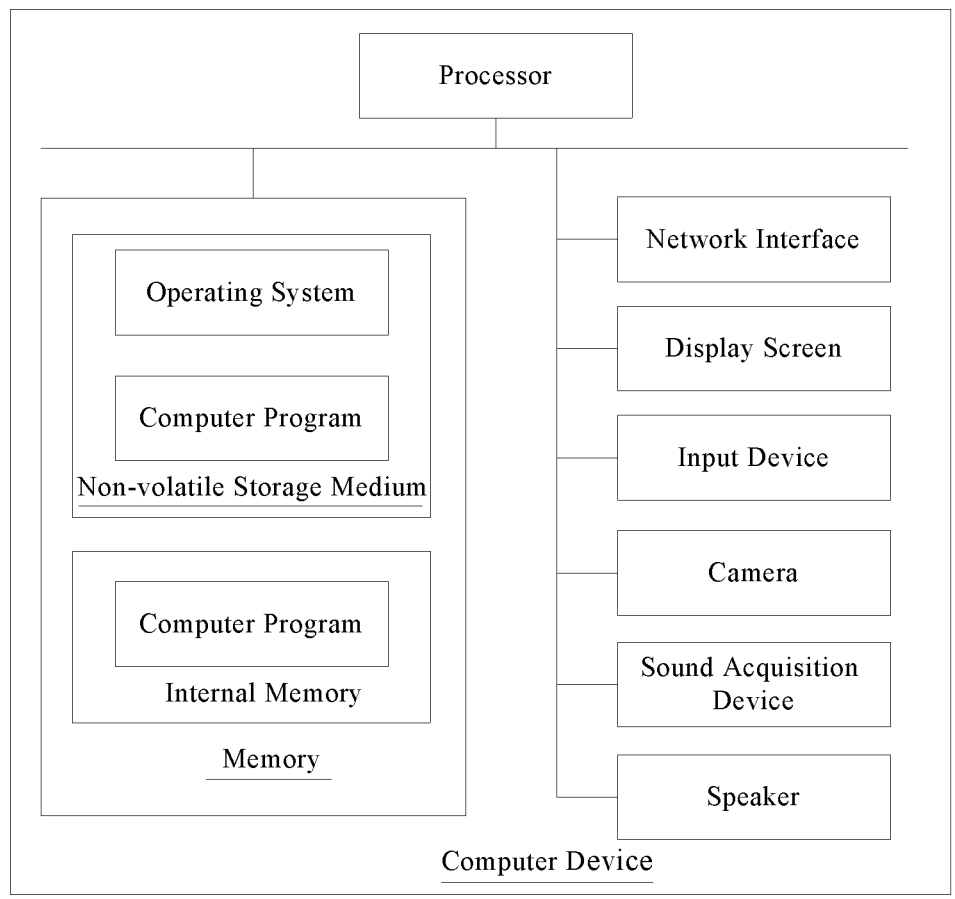
FIG. 6 is an internal structural diagram of a computer device in an embodiment.

FIG. 6 shows an internal structural diagram of a computer device in an embodiment. The computer device includes a processor, a memory, a network interface, an input device and a display screen which are connected through a system bus. The memory includes a nonvolatile storage medium and an internal memory. The non-volatile storage medium of the computer device stores an operating system, and can also store a computer program, which, when executed by the processor, can cause the processor to realize a permission abnormality detecting method. The internal memory can also store a computer program, which, when executed by the processor, can cause the processor to execute the permission abnormality detecting method. A display screen of the computer device can be a liquid crystal display screen or an electronic ink display screen, and the input device of the computer device can be a touch layer covered on the display screen, or a button, a trackball or a touch pad arranged on a shell of the computer device, or can be an external keyboard, touch pad or mouse.

It can be understood by those skilled in the art that the structure shown in FIG. 6 is only a block diagram of part of the structure related to schemes of this disclosure, and does not constitute a limitation on the computer device to which schemes of this disclosure are applied. The specific computer device may include more or less components than those shown in the figure, or combine some components or have a different component arrangement.

In an embodiment, as shown in FIG. 6, there is provided a computer device, which includes a memory, a processor and a computer program stored on the memory and executable on the processor, and the processor implements following steps when executing the program: a statement to be validated is inputted and a searching is made for the statement to obtain an evidence set of the statement; a hierarchical heterogeneous graph consisting of an entity node, a sentence node and a context node is constructed based on the evidence set; the statement and the evidence set are spliced and a node is initialized to obtain feature representation of the node; the feature representation of the node is updated based on inference according to a propagation direction of a neural network of the node in the hierarchical heterogeneous graph; and an inference path for the updated feature representation of the node is built and a prediction result of the statement is output according to the inference path.

In an embodiment, when the processor executes the computer program, it also realizes following steps: a key word group of the statement is extracted using a sentence parser according to the input statement; related documents of the key word group are retrieved through an application interface of a searching tool and storing the related documents in an article set; a sentence retrieval model is built so as to perform a sentence retrieval on an article in the article set and outputting associated sentences related to the statement; and relevance of the associated sentences is scored using the retrieval model and a sentence with a score falling within a preset threshold is taken as the evidence set.

In one embodiment, when the processor executes the computer program, it also realizes the following steps: the context node composed of all of the sentences, the sentence node composed of evidence sentences and the entity node composed of noun phrases are respectively extracted from the evidence set; a first directed edge from the entity node to the sentence node and a second directed edge from the sentence node to the context node are constructed and third directed edges for a sentence-level link, a context-level link and an article-level link are constructed according to the entity node.

In one embodiment, when the processor executes the computer program, it also realizes the following steps: feature representations of the entity node, the sentence node and the context node are spliced and feature representation of the inference path is obtained through a single-layer perceptron; an alignment vector of the inference path relative to the statement is calculated so as to obtain a selection probability of the inference path; and a predicted label distribution of the statement is calculated according to the selection probability and the prediction result of the statement is inferred according to the predicted label distribution.

In an embodiment, a computer-readable storage medium having a computer program stored thereon is provided. Following steps are realized when the program is executed by a processor: a statement to be validated is inputted and a searching is made for the statement to obtain an evidence set of the statement; a hierarchical heterogeneous graph consisting of an entity node, a sentence node and a context node is constructed based on the evidence set; the statement and the evidence set are spliced and a node is initialized to obtain feature representation of the node; the feature representation of the node is updated based on inference according to a propagation direction of a neural network of the node in the hierarchical heterogeneous graph; and an inference path for the updated feature representation of the node is built and a prediction result of the statement is output according to the inference path.

In an embodiment, when the processor executes the computer program, it also realizes following steps: a key word group of the statement is extracted using a sentence parser according to the input statement; related documents of the key word group are retrieved through an application interface of a searching tool and storing the related documents in an article set; a sentence retrieval model is built so as to perform a sentence retrieval on an article in the article set and outputting associated sentences related to the statement; and relevance of the associated sentences is scored using the retrieval model and a sentence with a score falling within a preset threshold is taken as the evidence set.

In one embodiment, when the processor executes the computer program, it also realizes the following steps: the context node composed of all of the sentences, the sentence node composed of evidence sentences and the entity node composed of noun phrases are respectively extracted from the evidence set; a first directed edge from the entity node to the sentence node and a second directed edge from the sentence node to the context node are constructed and third directed edges for a sentence-level link, a context-level link and an article-level link are constructed according to the entity node.

In one embodiment, when the processor executes the computer program, it also realizes the following steps: feature representations of the entity node, the sentence node and the context node are spliced and feature representation of the inference path is obtained through a single-layer perceptron; an alignment vector of the inference path relative to the statement is calculated so as to obtain a selection probability of the inference path; and a predicted label distribution of the statement is calculated according to the selection probability and the prediction result of the statement is inferred according to the predicted label distribution.

It can be understood by those skilled in the art that all or part of the processes in the above-mentioned methods can be completed by instructing related hardware through computer programs, which can be stored in a non-volatile computer readable storage medium, and when executed, can include flowcharts of the embodiments of the methods described above.

The technical features of the above-mentioned embodiments can be combined in an arbitrary manner. For simplicity of description, not all of the possible combinations of the technical features in the embodiments described above are described, however, as long as there is no contradiction between these combinations of the technical features, the combinations should be considered as falling within the scope of this specification.

The above-mentioned embodiments only represent several embodiments of this disclosure, and their descriptions are specific and detailed, but they should not be understood as limiting the scope of this disclosure as such. It should be noted that, several modifications and improvements can be made for those of ordinary skill in the field without departing from the concept of this disclosure, which belong to the protection scope of this disclosure. Therefore, the protection scope of this disclosure shall be subjected to the appended claims.

What is claimed is:

1. A fact validation method, comprising:
    inputting a statement to be validated and searching for the statement to obtain an evidence set of the statement;
    constructing a hierarchical heterogeneous graph consisting of an entity node, a sentence node and a context node based on the evidence set;
    splicing the statement and the evidence set and initializing a node to obtain the feature representation of the node;
    updating the feature representation of the node based on inference according to a propagation direction of a neural network of the node in the hierarchical heterogeneous graph; and
    building an inference path for the updated feature representation of the node and outputting a prediction result of the statement according to the inference path; wherein
    firstly, the hierarchical heterogeneous graph with nodes including sentences, entities and contexts is constructed according to the retrieved evidence sentences, and feature representations of the context node, the sentence node and the entity node are respectively initialized by an encoder based on a bidirectional structure;
    secondly, the entity nodes, sentence nodes and context nodes are sorted by granularity; thirdly, a hierarchical structure is adopted to realize semantic feature propagation from fine-grained nodes to coarse-grained nodes, and specifically feature propagation from the entity node to the sentence node and then to the context node; and fourthly, a potential inference path is extracted from the hierarchical heterogeneous graph and encoded by splicing feature representations of nodes involved in the potential inference path; and
    the feature propagation of the nodes in the hierarchical heterogeneous graph is node feature propagation based on a graph attention network mechanism, and the propagation direction is from the entity node to the sentence node and then to the context node, so as to realize updating among different types of nodes.

2. The fact validation method according to claim 1, wherein the inputting the statement to be validated and searching for the statement to obtain an evidence set of the statement comprises:
    extracting a key word group of the statement using a sentence parser according to the input statement;
    retrieving related documents of the key word group through an application interface of a searching tool and storing the related documents in an article set;
    building a sentence retrieval model so as to perform a sentence retrieval on an article in the article set and outputting associated sentences related to the statement; and
    scoring relevance of the associated sentences using the retrieval model and taking a sentence with a score falling within a preset threshold as the evidence set.

3. The fact validation method according to claim 1, wherein the constructing the hierarchical heterogeneous graph consisting of the entity node, the sentence node and the context node based on the evidence set comprises:
    respectively extracting the context node composed of all of the sentences, the sentence node composed of evidence sentences and the entity node composed of noun phrases from the evidence set;
    constructing a first directed edge from the entity node to the sentence node and a second directed edge from the sentence node to the context node; and
    constructing third directed edges for a sentence-level link, a context-level link and an article-level link according to the entity node; wherein
    three types of edges for the entity node: the sentence-level link, the context-level link and the article-level link are constructed, the sentence-level link representing a connection between nodes in the same sentence, the context-level link representing a connection between nodes belonging to a same entity in different articles, and a connection between nodes constructed by the article-level link being for a case where one node is located in a title of an article and another node is located in a rest of the article.

4. The fact validation method according to claim 1, wherein the building the inference path for the updated feature representation of the node and the outputting the prediction result of the statement according to the inference path comprises:
    splicing feature representations of the entity node, the sentence node and the context node and obtaining feature representation of the inference path through a single-layer perceptron;

calculating an alignment vector of the inference path relative to the statement so as to obtain a selection probability of the inference path; and calculating a predicted label distribution of the statement according to the selection probability and inferring the prediction result of the statement according to the predicted label distribution.

5. A fact validation system, comprising:

an evidence retrieval module configured for inputting a statement to be validated and searching for the statement to obtain an evidence set of the statement;

heterogeneous graph module configured for constructing a hierarchical heterogeneous graph consisting of an entity node, a sentence node and a context node based on the evidence set;

a node initialization module configured for splicing the statement and the evidence set and initializing a node to obtain feature representation of the node;

a node updating module configured for updating the feature representation of the node based on inference according to a propagation direction of a neural network of the node in the hierarchical heterogeneous graph; and a result prediction module configured for building an inference path for the updated feature representation of the node and outputting a prediction result of the statement according to the inference path; wherein the fact validation system firstly constructs the hierarchical heterogeneous graph with nodes including sentences, entities and contexts according to the retrieved evidence sentences, and respectively initializes feature representations of the context node, the sentence node and the entity node by an encoder based on a bidirectional structure; secondly sorts the entity nodes, sentence nodes and context nodes by granularity; thirdly adopts a hierarchical structure to realize semantic feature propagation from fine-grained nodes to coarse-grained nodes, and specifically feature propagation from the entity node to the sentence node and then to the context node; and fourthly extracts a potential inference path from the hierarchical heterogeneous graph and encodes the potential inference path by splicing feature representations of nodes involved in the potential inference path; and the feature propagation of the nodes in the hierarchical heterogeneous graph is node feature propagation based on a graph attention network mechanism, and the propagation direction is from the entity node to the sentence node and then to the context node, so as to realize updating among different types of nodes.

6. The fact validation system according to claim 5, wherein the evidence retrieval module comprises an evidence set unit configured for:

extracting a key word group of the statement using a sentence parser according to the input statement;

retrieving related documents of the key word group through an application interface of a searching tool and storing the related documents in an article set;

building a sentence retrieval model so as to perform a sentence retrieval on an article in the article set and outputting associated sentences related to the statement; and scoring relevance of the associated sentences using the retrieval model and taking a sentence with a score falling within a preset threshold as the evidence set.

7. The fact validation system according to claim 5, wherein the heterogeneous graph module comprises a graph construction unit configured for:

respectively extracting the context node composed of all of the sentences, the sentence node composed of evidence sentences and the entity node composed of noun phrases from the evidence set;

constructing a first directed edge from the entity node to the sentence node and a second directed edge from the sentence node to the context node; and constructing third directed edges for a sentence-level link, a context-level link and an article-level link according to the entity node; wherein three types of edges for the entity node: the sentence-level link, the context-level link and the article-level link, the sentence-level link representing a connection between nodes in the same sentence, the context-level link representing a connection between nodes belonging to a same entity in different articles, and a connection between nodes constructed by the article-level link being for a case where one node is located in a title of an article and another node is located in a rest of the article.

8. The fact validation system according to claim 5, wherein the result prediction module comprises a tag inferring unit configured for:

splicing feature representations of the entity node, the sentence node and the context node and obtaining feature representation of the inference path through a single-layer perceptron;

calculating an alignment vector of the inference path relative to the statement so as to obtain a selection probability of the inference path; and calculating a predicted label distribution of the statement according to the selection probability and inferring the prediction result of the statement according to the predicted label distribution.

9. A computer device, comprising a memory, a processor and a computer program stored on the memory and executable on the processor, wherein when the processor executes the computer program, steps of the method according to claim 1.

10. A non-transitory computer-readable storage medium having a computer program stored thereon, wherein the computer program, when executed by a processor, realizes steps of the method according to claim 1.

11. The computer device according to claim 9, wherein the inputting the statement to be validated and searching for the statement to obtain the evidence set of the statement comprises:

extracting the key word group of the statement using the sentence parser according to the input statement;

retrieving related documents of the key word group through the application interface of the searching tool and storing the related documents in the article set;

building the sentence retrieval model so as to perform the sentence retrieval on an article in the article set and outputting associated sentences related to the statement; and scoring relevance of the associated sentences using the retrieval model and taking the sentence with a score falling within a preset threshold as the evidence set.

12. The computer device according to claim 9, wherein the constructing the hierarchical heterogeneous graph consisting of the entity node, the sentence node and the context node based on the evidence set comprises:

respectively extracting the context node composed of all of the sentences, the sentence node composed of evidence sentences and the entity node composed of noun phrases from the evidence set;

constructing the first directed edge from the entity node to the sentence node and the second directed edge from the sentence node to the context node; and constructing third directed edges for the sentence-level link, the context-level link and the article-level link according to the entity node; wherein three types of edges for the entity node: the sentence-level link, the context-level link and the article-level link are constructed, the sentence-level link representing the connection between nodes in the same sentence, the context-level link representing the connection between nodes belonging to the same entity in different articles, and the connection between nodes constructed by the article-level link being for the case where one node is located in a title of the article and another node is located in the rest of the article.

13. The computer device according to claim 9, wherein the building the inference path for the updated feature representation of the node and the outputting the prediction result of the statement according to the inference path comprises:

splicing feature representations of the entity node, the sentence node and the context node and obtaining feature representation of the inference path through the single-layer perceptron;

calculating the alignment vector of the inference path relative to the statement so as to obtain the selection probability of the inference path; and calculating the predicted label distribution of the statement according to the selection probability and inferring the prediction result of the statement according to the predicted label distribution.

14. The non-transitory computer-readable storage medium according to claim 10, wherein the inputting the statement to be validated and searching for the statement to obtain an evidence set of the statement comprises:

extracting a key word group of the statement using a sentence parser according to the input statement;

retrieving related documents of the key word group through an application interface of a searching tool and storing the related documents in an article set;

building a sentence retrieval model so as to perform a sentence retrieval on an article in the article set and outputting associated sentences related to the statement; and scoring relevance of the associated sentences using the retrieval model and taking a sentence with a score falling within a preset threshold as the evidence set.

15. The non-transitory computer-readable storage medium according to claim 10, wherein the constructing the hierarchical heterogeneous graph consisting of the entity node, the sentence node and the context node based on the evidence set comprises:

respectively extracting the context node composed of all of the sentences, the sentence node composed of evidence sentences and the entity node composed of noun phrases from the evidence set;

constructing a first directed edge from the entity node to the sentence node and a second directed edge from the sentence node to the context node; and constructing third directed edges for a sentence-level link, a context-level link and an article-level link according to the entity node; wherein three types of edges for the entity node: the sentence-level link, the context-level link and the article-level link are constructed, the sentence-level link representing a connection between nodes in the same sentence, the context-level link representing a connection between nodes belonging to a same entity in different articles, and a connection between nodes constructed by the article-level link being for a case where one node is located in a title of an article and another node is located in a rest of the article.

16. The non-transitory computer-readable storage medium according to claim 10, wherein the building the inference path for the updated feature representation of the node and the outputting the prediction result of the statement according to the inference path comprises:

splicing feature representations of the entity node, the sentence node and the context node and obtaining feature representation of the inference path through the single-layer perceptron;

calculating the alignment vector of the inference path relative to the statement so as to obtain the selection probability of the inference path; and calculating the predicted label distribution of the statement according to the selection probability and inferring the prediction result of the statement according to the predicted label distribution.

\* \* \* \* \*